June 19, 1928.

A. CARLSON 1,673,798

WIND DEFLECTOR

Filed March 27, 1923

Witnesses.

Inventor.
Alexander Carlson

By Ralph N. Chilton
his Attorney.

June 19, 1928.  A. CARLSON  1,673,798
WIND DEFLECTOR
Filed March 27, 1923  2 Sheets-Sheet 2
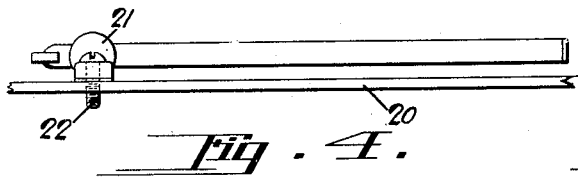
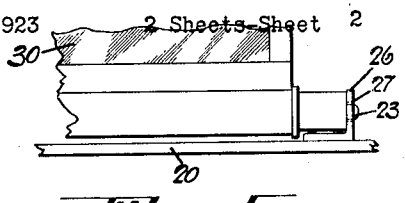
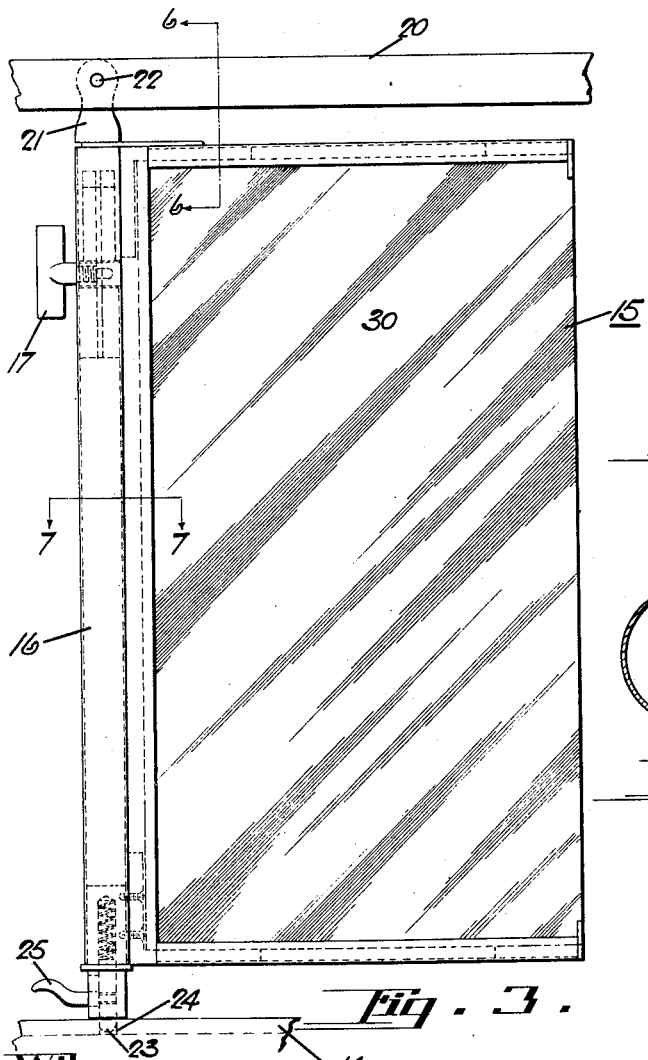
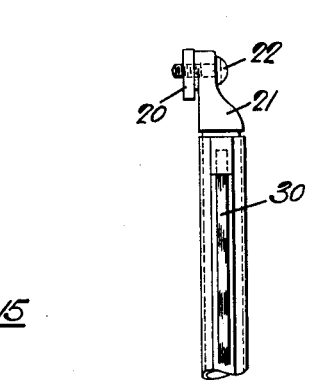
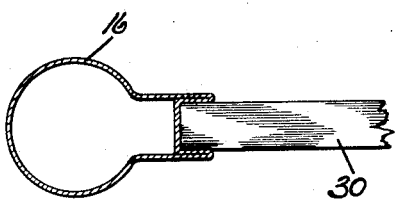
Witnesses.
Inventor.
Alexander Carlson
By Ralph H. Chilton
his Attorney.

Patented June 19, 1928.

1,673,798

UNITED STATES PATENT OFFICE.

ALEXANDER CARLSON, OF DAYTON, OHIO, ASSIGNOR TO DAYTON-WRIGHT COMPANY, OF DAYTON, OHIO, A CORPORATION OF DELAWARE.

WIND DEFLECTOR.

Application filed March 27, 1923. Serial No. 628,139.

This invention relates to wind deflectors for vehicle bodies and has special reference to passenger automobiles commonly known as touring cars.

An object of the invention is to provide a wind shield for the rear seat so located and supported that (1) when in use there will be no obstruction to the free movement of the occupants of the rear seat; (2) that an open space will be provided between the rear and front seats permitting conversation or other communication therebetween; (3) that air striking the shield will not be deflected against the back of occupants of the front seat but will be deflected laterally outwardly from the car body; and (4) that when not in use the shield can be swung upwardly to occupy an out of the way position in the top of the car.

More specifically, the invention consists in locating at or near the front corners of the rear seat two wind deflectors pivotally mounted upon substantially vertical axes and adjustable to various angles when in use, and arranged to swing about a pivot point at the top to a substantially horizontal position adjacent the top and be there firmly secured when not in use.

Further objects and advantages of the present invention will be apparent from the following description, reference being had to the accompanying drawings, wherein a preferred form of embodiment of the present invention is clearly shown.

In the drawings:

Fig. 3 is a side view of a wind deflector on an enlarged scale and shows the construction in greater detail.

Fig. 4 is a view along line 4—4 of Fig. 1 and shows the hinge attachment of the deflector to the top rail.

Fig. 5 is a view along line 5—5 of Fig. 1 and shows the means for retaining the deflector in inoperative position.

Fig. 6 is a view along line 6—6 of Fig. 3 and shows another view of the hinge attachment of the deflector to the top rail.

Fig. 7 is a section on line 7—7 of Fig. 3.

In the drawings, similar reference characters refer to similar parts throughout the several views.

Figs. 1 and 2 show parts of the body of a two-seated automobile which may be of any type. Numeral 10 designates the top, as a whole, which has been illustrated as a nonfolding or so-called permanent top. 11 is the rear seat, 12 the front seat, 13 the rear door and 14 the side of the body.

Figure 1:
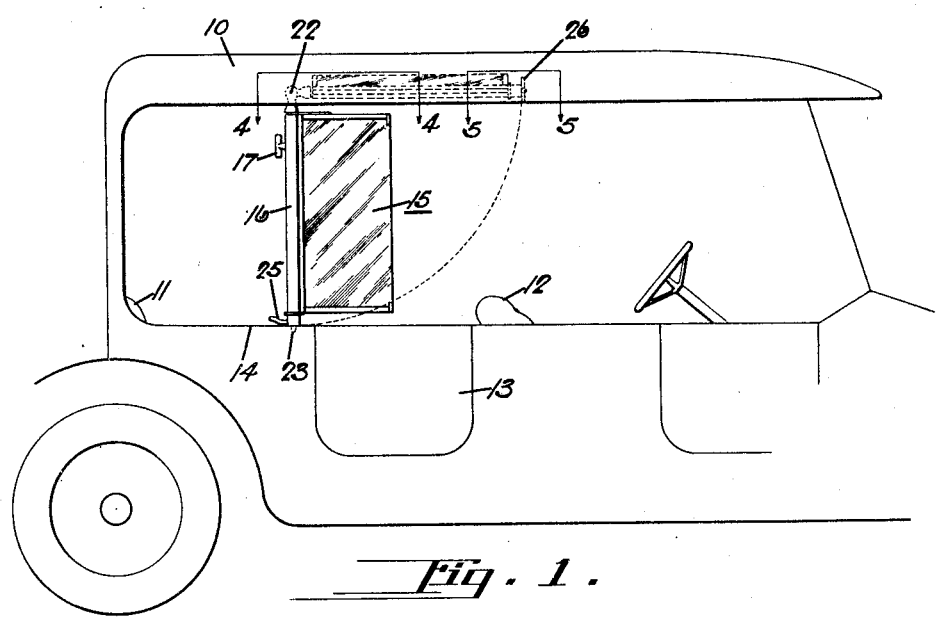
Fig. 1 is a side view of a touring car equipped with wind deflectors according to this invention, and showing in dotted lines the position of the deflector when in inoperative position.

The wind deflectors, designated in their entirety by numeral 15, are pivotally mounted by means of a standard 16 which when in operative position extends from the top 10 down to the body 14. When in this position the deflectors 15 may be adjusted to any desired angle about the center line of the standard 16 as an axis, and held in adjusted position by tightening the thumb screw 17. The details of the construction are better illustrated in Figs. 3 to 7 inclusive. Numeral 20 designates the top rail which extends along the sides of the top. This top rail has been shown as a metallic rail of quite narrow width, however this invention may as well be applied to a top having wooden top rails of greater dimensions. The standard 16 has a hinge fitting 21 at its upper end which is suitably pivoted upon the top rail 20 by means of a pin 22. The lower end of standard 16 is provided with a spring pressed catch 23 which has a cooperating recess 24 on the top edge of side 14 of the body. A small hand lever 25 is provided for retracting catch 23 from its recess, whereupon the standard 16 may be swung about the hinge pin 22 forwardly, as shown by the dotted lines in Fig. 1, to a substantially horizontal position up adjacent the top 10 on the inside of the top rail 20, as shown in Fig. 5. A small bracket 26 suitably secured to the top rail 20 and having a recess 27 therein for receiving the catch 23 is provided for retaining the standard 16 in the folded or inoperative position.

It is obvious that when standard 16 is swung to the horizontal position the deflector 15 must also be adjusted angularly about the axis of standard 16 so that it will lie up close to the top 10. In the embodiment illustrated the standard 16 is rigidly secured to the plate glass 30 of the deflector 15 (see Fig. 7) and is rotatable therewith by being rotatably mounted upon the hinge fitting 21.

The shank of the hinge fitting 21, extends down within the tube 16 and a thumb screw 17 is provided for clamping the tube 16 rigidly to the shank of hinge fitting 21. By means of this thumb screw 17 the deflector 15 may be adjusted to any desired angle, either inwardly or outwardly as shown by the radial dotted lines in Fig. 2, when it is in the operative position, and also when the deflector is in its folded or inoperative position the glass may be adjusted to lie close up to the top of the car so that it will be entirely out of the way.

Figure 2:
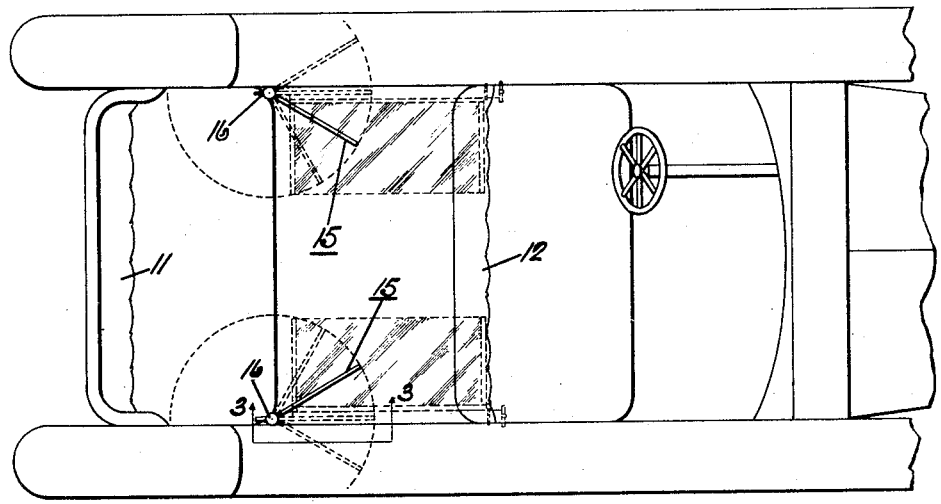
Fig. 2 is a diagrammatic plan view of the car shown in Fig. 1, but with the top omitted.

It will be seen that by folding the deflectors 15 straight backward as shown by the dotted lines in Fig. 2, they will be out of the way for persons getting in or out of the rear door. It will therefore not be necessary to fold them up in the top for the mere purpose of getting in or out of the rear compartment.

While the form of embodiment as herein disclosed, constitutes a preferred form, it is to be understood that other forms might be adopted, all coming within the scope of the claims which follow.

What I claim is as follows:

1. In an automobile body having front and rear seats, in combination, a swingable hinge post pivotally attached at its upper end to the vehicle top and having a releasable latch means at its lower end adapted to engage the side of the vehicle body forward of the rear seat whereby said hinge post is fixed in a substantially vertical position, a wind deflector hinged upon said hinge post, means for fixing said deflector at various angles upon said hinge post, and means for securing the lower end of said hinge post to the vehicle top when said latch means is released and it is swung up into the vehicle top.

2. In an automobile body having front and rear seats, in combination, a swingable hinge post pivotally attached at its upper end to the vehicle top, and having its lower end engageable with the side of the vehicle body slightly forward of the rear seat, a wind deflector hinged upon said hinged post, means for fixing said deflector at various angles upon said hinge post, and means for retaining said hinge post in a substantially horizontal out of the way position adjacent the vehicle top when not in use.

3. In an automobile body having front and rear seats, in combination, a hinge post having its upper end mounted upon the vehicle top in such manner that it may be swung from a substantially vertical position to a substantially horizontal position, releasable means for fixing the lower end of said hinge post to the side of the vehicle body when in its vertical position, releasable means for fixing said lower end to the vehicle top when in its horizontal position, and a wind deflector hinged upon said hinge post and having means for fixing it thereto at various angles.

4. In a vehicle body having a rear seat and a top, in combination, a hinge post pivotally attached at its upper end to the vehicle top to swing in a plane longitudinal to the body to a position in the vehicle top and releasably attached at its lower end to the side of the vehicle body forward of the rear seat, a wind deflector pivotally mounted upon said hinge post and swingable therewith and adapted to be fixed at various angles upon said hinge post, and means for securing the lower end of said hinge post rigidly in place in the vehicle top when swung to its upper position.

In testimony whereof I hereto affix my signature.

ALEXANDER CARLSON.